United States Patent
Schwesinger et al.

(10) Patent No.: US 10,938,915 B1
(45) Date of Patent: Mar. 2, 2021

(54) SESSION DATA ISOLATION AND MANAGEMENT

(71) Applicant: United Services Automobile Association (USAA), San Antonio, TX (US)

(72) Inventors: Phillip Schwesinger, San Antonio, TX (US); David Harris, San Antonio, TX (US); Linda Karen Leach, San Antonio, TX (US); Douglas Anthony Hall, Lucas, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 335 days.

(21) Appl. No.: 15/677,911

(22) Filed: Aug. 15, 2017

Related U.S. Application Data

(60) Provisional application No. 62/375,736, filed on Aug. 16, 2016, provisional application No. 62/404,401, filed on Oct. 5, 2016, provisional application No. 62/458,256, filed on Feb. 13, 2017.

(51) Int. Cl.
  *H04L 29/08* (2006.01)
  *G06F 7/14* (2006.01)
  *G06F 16/955* (2019.01)

(52) U.S. Cl.
  CPC ............ *H04L 67/146* (2013.01); *G06F 7/14* (2013.01); *G06F 16/955* (2019.01); *H04L 67/02* (2013.01)

(58) Field of Classification Search
  None
  See application file for complete search history.

(56) References Cited

U.S. PATENT DOCUMENTS

| | | | | |
|---|---|---|---|---|
| 6,389,460 B1* | 5/2002 | Stewart | ................ | G06K 9/222 |
| | | | | 709/217 |
| 6,910,180 B1* | 6/2005 | Cui | ..................... | G06F 16/955 |
| | | | | 715/201 |
| 7,991,830 B2* | 8/2011 | Li | ........................ | H04L 29/06 |
| | | | | 709/203 |
| 8,200,833 B1* | 6/2012 | Lau | ..................... | H04L 63/168 |
| | | | | 709/228 |
| 8,910,277 B1* | 12/2014 | Reis | ..................... | G06F 9/468 |
| | | | | 726/22 |
| 9,232,011 B2* | 1/2016 | Galushka | ............ | G06F 16/958 |
| 2001/0013096 A1* | 8/2001 | Luckenbaugh | ..... | G06F 21/6227 |
| | | | | 713/154 |

(Continued)

*Primary Examiner* — Minh Chau Nguyen
*Assistant Examiner* — Ishrat Rashid
(74) *Attorney, Agent, or Firm* — Fish & Richardson P.C.

(57) ABSTRACT

Techniques are described for managing cookies, including separately managing cookie data associated with different browser tabs. Cookie management includes the isolation of whitelisted cookies from server responses into background storage and then back onto server requests, removing those cookies from the response header and thus from the cookie store. This isolation is managed with the concept of tab ownership between parent and child tabs to maintain isolation separately for each owner (e.g., the parent) and its children. Exposure to client pages is handled by placing those cookies into a keyed location in session storage for every tab where that cookie is to be visible. An event is then triggered for that client page to let it know that session storage has been updated.

20 Claims, 9 Drawing Sheets

(56) References Cited

U.S. PATENT DOCUMENTS

| | | | | |
|---|---|---|---|---|
| 2009/0193129 A1* | 7/2009 | Agarwal | ............... | H04L 67/28 |
| | | | | 709/229 |
| 2009/0287824 A1* | 11/2009 | Fisher | ................. | G06F 9/542 |
| | | | | 709/226 |
| 2010/0031153 A1* | 2/2010 | Ortwein | .............. | G06F 9/542 |
| | | | | 715/733 |
| 2012/0016836 A1* | 1/2012 | Fender | ................ | G06Q 10/10 |
| | | | | 707/603 |
| 2014/0108667 A1* | 4/2014 | Reddy | ................ | G06F 16/954 |
| | | | | 709/228 |

* cited by examiner

SESSION DATA ISOLATION AND MANAGEMENT

CROSS-REFERENCE TO RELATED APPLICATIONS

The present disclosure is related to, and claims priority to, the following applications: U.S. Provisional Patent Application Ser. No. 62/375,736, titled "Session Cookie Isolation and Management," filed on Aug. 16, 2016; U.S. Provisional Patent Application Ser. No. 62/404,401, titled "Session Cookie Isolation and Management," filed on Oct. 5, 2016; and U.S. Provisional Patent Application Ser. No. 62/458,256, titled "Session Data Isolation and Management," filed on Feb. 13, 2017. The entirety of each of these applications is incorporated by reference into the present disclosure.

BACKGROUND

A cookie, such as a Hypertext Transfer Protocol (HTTP) cookie, is a parcel of data that is sent from a web site being viewed through a web browser. The cookie is stored on the user's computing device, by the web browser, and used to hold stateful information associated with the user's browsing on the web site.

SUMMARY

Implementations of the present disclosure are generally directed to managing cookie data. More particularly, implementations of the present disclosure are directed to isolating and managing cookie data associated with different sessions and/or different customers, for example in a customer service environment.

In general, innovative aspects of the subject matter described in this specification can be embodied in methods that include operations of: responsive to detecting a request to be transmitted from a web browser to a server, determining an identifier associated with a tab used to initiate the request in the web browser; incorporating, into a request header of the request, first cookie data for at least one managed cookie, the first cookie data stored in background storage associated with the tab; transmitting the request to the server; receiving a response from the server; merging in the background storage the first cookie data with second cookie data for the at least one managed cookie that is included in a response header of the response; removing the at least one managed cookie from the response header, prior to providing the response for processing by the web browser; and storing the second cookie data for the at least one managed cookie in session storage associated with the tab.

Implementations can optionally include one or more of the following features: the tab used to initiate the request is a parent tab; the identifier is a tab identifier of the parent tab; the tab used to initiate the request is a child tab of a parent tab; the identifier is a tab identifier of the parent tab; the parent-child relationship between the parent tab and the child tab is determined based on a cookie owner mapping (COM); the actions further include modifying the first cookie data based on cookie data stored in the background storage associated with the tab, prior to transmitting the request; the second cookie data for the at least one managed cookie is stored in a key-value store in the background storage, the key-value store providing a mapping between the identifier and the second cookie data; the at least one managed cookie is designated in a whitelist that indicates which cookies are to be managed independently of a cookie store of the web browser; and/or the at least one managed cookie includes one or more of: end-user data, end-user authentication information, data center routing information for an end-user, and failover data for the end-user.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and/or technical improvements over previously available systems. By preventing the overwriting of cookie data stored in a cookie store of a browser, which would occur in at least some instances when a browser lacks a mechanism to request fresh cookies, implementations avoid data loss and data corruption that occurs in browsers traditionally operating without the cookie data isolation mechanism described herein. Accordingly, implementations avoid the consumption of processing power, storage space, memory, network capacity, and/or other computing resources that traditionally operating browsers would consume in recovering from data loss and data corruption errors.

Some browsers (e.g., at least some versions of Internet Explorer) enable the programmatic control of cookie sharing using command-line options, but such a feature is not supported in other browsers which have no concern about isolation. Isolation occurred in the past because we could start a browser (e.g., Internet Explorer) as a separate process, which in turn caused the browser to use a separate cookie store. Other web browsers no longer support isolation in a programmatic or performant way, and only provide alternative profiles (heavy performance/resource hit) or "incognito" mode (which only allows one separation vs many). Implementations provide for the managing of cookies independently of a browser's cookie store.

Session isolation includes the isolation of whitelisted cookies from server responses into background storage and then back onto server requests, removing those cookies entirely from the response header and thus preventing them from being written to the cookie store. This isolation is managed with the concept of tab ownership between parent and child tabs to maintain isolation separately for each owner (e.g., the parent) and its children. Exposure to client pages is handled by placing those cookies into a specially keyed location in session storage for every tab where that cookie should be visible. An event is then triggered for that client page to let it know that session storage has been updated. In some implementations, a client is not allowed to modify a cookie that is being separately managed.

The local page may create cookies as appropriate, separate from the server response header setting them. If the local page creates a cookie, e.g., "cookie1," and that same cookie1 is to be managed on the next response, it may not be removed from the page's cookie store and the server can no longer update the value as that client sees it. Accordingly, at least some implementations write out to session storage and notify the client as described above. Assuming the client was adjusted to look first at session storage for the cookie value, then this mechanism works and is the reason for limiting the set of managed cookies to those on a whitelist of possible cookies. That page may choose, if aware of the new mechanism, to update or even destroy its own cookie storage copy and to continue to only look at session storage, or the page may ignore the cookie store and look at session storage with the same results. Pages using the techniques described herein can be coded to support this behavior.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
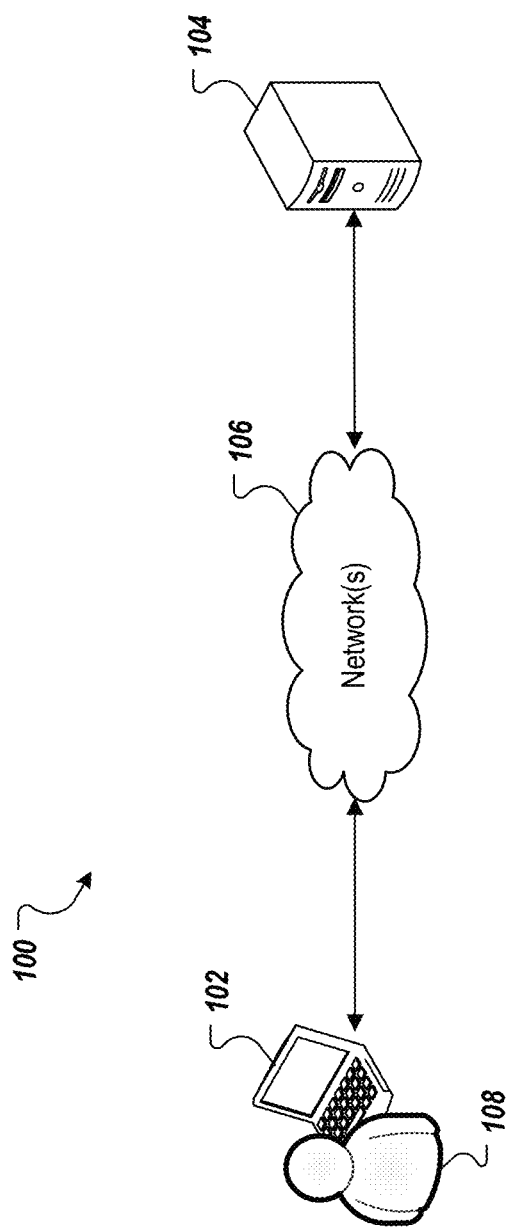
FIG. 1 depicts an example system architecture in accordance with implementations of the present disclosure.

Implementations of the present disclosure are directed to systems, devices, methods, and computer-readable media for managing session data, including isolating cookie data associated with different tabs in a browser. In older, legacy web browsers, multiple windows or tabs could be launched, and the different sets of cookies generated through different sessions in the different browsers would be isolated. More recent versions of web browsers, such as Google Chrome™ and Microsoft Edge™, overwrite cookies of one session with cookies of another session. Legacy web applications may have been created under the assumption that cookies for a particular session would be stored separately (e.g., isolated) from cookies for a different session, given that such legacy applications were written in view of the older browser support for cookie isolation. Accordingly, session sharing on the legacy applications has the potential to allow cookie data from different sessions to be intermixed.

For example, in a customer service environment, a customer service representative (CSR) may open multiple instances of a web application (e.g., in different browser windows or different tabs of a browser window) to provide support to different customers. Each instance may be described as a different session, for which a different set of session cookies is downloaded to the CSR's computing device. The different sets of session cookies may include information associated with different customers being supported. Thus, if the web application was created based on the assumption that the browser would keep different session cookies isolated from one another, running the multiple instances of the web application on a more current version of a browser may lead to the overwriting of customer data across the multiple, concurrent sessions.

To work with current (and future) browsers, implementations provide a technique in which the use of session cookies for applications (particularly legacy applications) is managed differently or eliminated. Edge, Chrome, Firefox, and other browsers, by default, share cookies across browser tabs (e.g., across sessions). As users (such as CSRs) open multiple tabs for different accounts, implementations ensure that the information currently stored in cookies remains properly isolated across different sessions.

In the example of account management in a customer service environment, CSRs working with multiple customers and with multiple browser tabs open may be a common situation. Implementations ensure that one customer's information is not viewed or modified while a CSR is intending to view or modify a different customer's information. In addition, customer data may be routed to specific data centers and environments, and the CSR's connection with that data is routed to those same locations, reducing the chance that data for a customer is modified from one session and viewed from another session before the data has been propagated to another data center or environment. Under controlled conditions, multiple tabs can be opened for a single customer, and implementations allow the session cookie data to be shared within that tab hierarchy related to the same customer. This allows the CSR to continue to service the customer from more than one web application.

Under certain conditions, the page of a tab and/or its children have access to cookies, or to the data that was stored in the cookies, to determine the value of a cookie returned by the server. Moreover, under certain conditions, the page of a tab and/or its children can modify cookies, and/or the cookie data, to change the information that is passed to the server through the standard cookie mechanism.

A session cookie, also called a transient cookie, is a cookie that is erased when the user closes the web browser. The session cookie is stored in temporary memory and is not retained after the browser is closed. Session cookies are created differently from persistent cookies by not creating an 'expires' attribute. Session cookies can be created by the server or the client. Generally, session cookies are created by the server and then handed back and forth between the server and client in future exchanges, but this may not always be the case.

A persistent cookie, also called a permanent cookie or a stored cookie, is a cookie that is stored on a client device's hard drive or other storage (e.g., SSD, SAN, virtual storage, etc.) until it expires (persistent cookies are set with expiration dates) or until the user deletes the cookie. Persistent cookies are created differently from session cookies by having an 'expires' attribute with a date and time. Persistent cookies can be created by the server or the client.

An HTTP-only cookie, also called a server side only cookie, can be a session or persistent cookie that is not visible to the client page. Use of such cookies requires a browser that supports such cookies. The client page cannot see, modify, or create HTTP-only cookies.

In certain browsers (e.g., in the Chrome Extension API), individual windows or tabs may be referenced by a tab ID. A web page in its own window is a tab in its own window. Accordingly, the terms tab and window may be used interchangeably depending on the context. When an actual distinction is important between the two, the distinction will be noted.

Local storage is an HTML5 construct, referenced as localStorage or Window.localStorage in Javascript. Local storage is a persisted storage mechanism that allows data to be stored outside the life of a particular page. Local storage is unique to the specific origin (including both the particular domain and protocol) of a page. Unlike cookies, local storage is not transferred to the server. Like persistent cookies, local storage can exist beyond the lifecycle of the browser and can be shared between pages of the same origin. Session storage is similar to local storage, but with two differences: 1) two documents (e.g., pages, iframes, tabs), even with the exact same origin, may not see each other's session storage; and 2) session storage does not live beyond the lifetime of the page that created it. Background storage is data that is stored in the background page's JavaScript context, accessible only to the background page.

Session cookies, in particular, are to be isolated, but all cookies, even persistent cookies, are also shared among all pages and tabs. Cookies that are not HTTP-only can be seen and modified by the local page. Some web pages introduce or even modify cookies (both session and persistent) from the client, to then be consumed and possibly propagated by the server. Certain routing approaches use session cookies to manage data consistency between data centers. These session cookies need to be handled in a way that ensures that requests on behalf of a given customer use consistent and correct routing environment values throughout the lifecycle of the session and separate from the lifecycle of sessions for other customers.

In some implementations, a session cookie isolation browser extension is used to provide the session cookie isolation features described herein. In some implementations, the extension places session cookies in background storage and controls how they are propagated in web requests and the responses from those requests. Incoming session cookies from an HTTP response page are copied into background storage and grouped, or siloed, by a parent tab identifier (ID) which includes the ID of the tab or its parent that received the response. This allows session cookies to be tracked per tab or parent tab. Session storage for each parent tab and its children is created/modified on every response, based on the background storage, once incoming session cookies are reconciled with background storage.

Outgoing session cookies from a browser request are either replaced by or merged with the background store in such a way that the correct cookies are part of the request, possibly dependent on filtering on the cookie name. Some page-modified cookies that are already being tracked may be allowed to overwrite the background store version, while others may be allowed to be changed on response. As an alternative, session storage modifications may also be used to manipulate the cookies sent in the request. Other cookies in the request may be removed. Background store cookies are then placed in the request before sending on to the server.

Applications may be allowed to choose when a new tab is to share their cookies. Those new tabs are considered children of the tab that created them, their parent. An ownership mapping, referred to as a cookie owner mapping (COM) is maintained to know which tabs are children of a parent. In some implementations, only parent tabs are used to track cookies. In some implementations, the following browser lifecycle behavior is provided.

On Request—before headers are finalized on request by the client, the cookie header is modified to include managed cookies from the extension store, matching the current tab context (cookie owner tab ID as defined in the COM) and following standard cookie domain and path filtering rules.

On Response—when a response is received from the server, each SetCookie response header for domains of interest (e.g., domains relevant to the customer service environment) is copied into the background page's Javascript store, following any applicable merge rules to maintain expected behavior. Those cookie names and values are written into the session store of the siloed pages, by passing the data through the contentscript page and into the siloed pages, following standard cookie domain and path filtering rules. Implementations also support filtering of SetCookie headers to manage session cookies (e.g., compared to also modifying persistent cookies).

On Tab Open—if a new tab is opened and session propagation is requested, a mapping (propagation map) may be stored that maps the new tab ID to the cookie owner tab ID. To determine the cookie owner tab ID, the value of the opening tab ID's entry in the propagation map may be retrieved. If found, the opening tab's cookie owner ID is used as the new tab's cookie owner ID. The same process may be followed for requests. In some implementations, a session propagation request may use a query string parameter "propagate=true". In some implementations, the query string parameter is not used. A different mechanism can be used to determine a new parent hierarchy because a tab can be opened externally and then there will be no parent, such as when the tab is opened through an external launch instead of a page itself requesting a new tab. The extension API indicates if there is parent tab, and an external launch will not have one.

On Tab Close—the propagation map entry corresponding to the closed tab ID is removed. If there are no more entries matching the closed tab ID's COM, the entries for the owning tab may also be removed from the background storage.

Table 1 below provides an example COM.

TABLE 1

| Tab ID | Opening Tab ID | Propagation Requested? | Cookie Owner Mapping | Cookies Stored | Cookies Sent and/or Received |
|---|---|---|---|---|---|
| 1264 | n/a | n/a | 1264→1264 | 1264, s_cookie1<br>1264, s_cookie2 | s_cookie1<br>s_cookie2 |
| 1369 | 1264 | Yes | 1369→1264 | 1264, s_cookie1<br>1264, s_cookie2 | s_cookie1<br>s_cookie2 |
| 1674 | 1369 | Yes | 1674→1264 | 1264, s_cookie1<br>1264, s_cookie2 | s_cookie1<br>s_cookie2 |
| 1381 | 1264 | No | 1381→1381 | 1381, s_cookie1<br>1381, s_cookie2 | s_cookie1<br>s_cookie2 |
| 1513 | n/a | n/a | 1513→1513 | 1513, s_cookie1<br>1513, s_cookie2 | s_cookie1<br>s_cookie2 |

In the example of Table 1, closing tab 1369 causes the removal of the cookie owner mapping 1369→1264. Closing tab 1513 causes the removal of cookie owner mapping 1513→1513, and the removal of cookies tracked for tab 1513. Closing tab 1264 causes the removal of cookie owner mapping 1264→1264. Closing tab 1381 causes the removal of cookie owner mapping 1381→1381, and the removal of cookies tracked for tab 1381. Closing tab 1674 causes the removal of cookie owner mapping 1674→1264, and the removal of cookies tracked for tab 1264. In some implementations, as shown in the Table, the cookies are tracked as a group according to the parent tab ID associated with each of the cookies. In addition to the COM table, some implementations also use a table that maps all cookies for a particular owning tab. In some implementations, this table is a table of sub-tables. For example, in Table 1, each cell of the "Cookies Stored" column may be described as a sub-table that provides a set of mappings from tab ID to cookie.

In some instances, a cookie can be created by the page and accepted by the server when a request is made. If the server accepts the cookie it can then also return it in the next response. In some implementations, this behavior is not prevented even if the cookie is in a whitelist to indicate separate managing of the cookie. Implementations allow the cookie to be initiated by the page and the server then allows it to continue to live, at which point it is managed separately if it is in the whitelist. However, because the page initially created the cookie, it will always see the "first version" of the cookie, even if the server modified it. Accordingly, implementations allow the page to see managed cookies through session storage. The page knows if the cookie was modified by the server, but some implementations do not "take over" the cookie storage mechanism that the browser owns.

FIG. 1 depicts an example system architecture 100 in accordance with implementations of the present disclosure. As shown in the example of FIG. 1, a client computing device 102 communicates with one or more server computing devices 104 over one or more network(s) 106. The devices 102 and 104 may include any suitable type and number of computing devices, and the network(s) 106 may include wired and/or wireless communication network(s). The client computing device 102 may be operated by a user 108. In some examples, the user 108 is a CSR using the device 102 to provide customer service for one or more customers in a customer service environment. In such examples, the communications between the devices 102 and 104 may be to request and receive customer information. In some instances, the communications may be configured according to one or more communication protocols, such as a version of HTTP. The CSR may be viewing information regarding multiple customers on the device 102, and the device 102 may run multiple browser instances (e.g., windows or tabs) to enable the CSR to view information regarding multiple customers, as described above. Accordingly, the communications between the devices 102 and 104 may carry information regarding multiple customers associated with the multiple sessions.

Figure 2A:
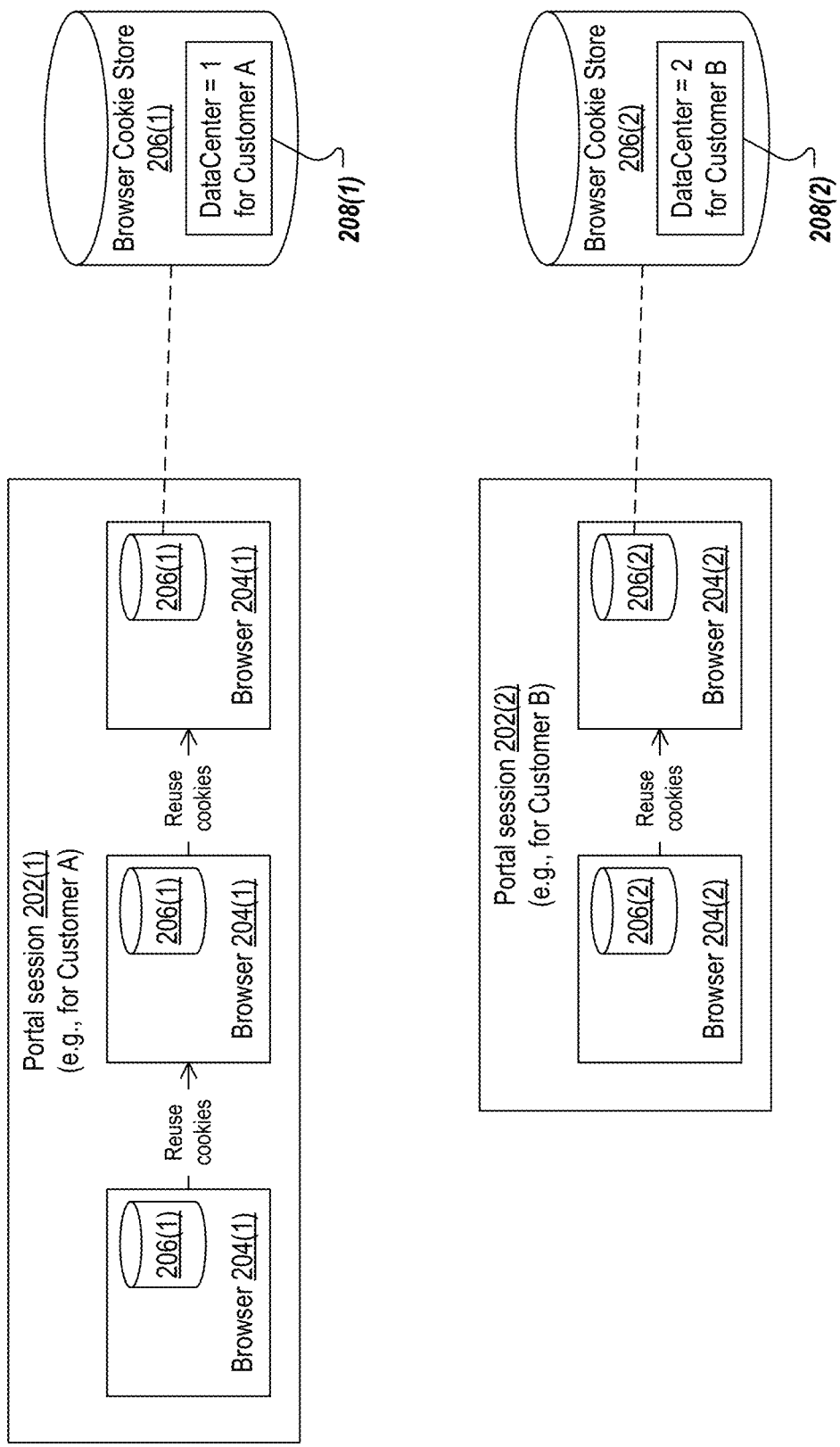
FIGS. 2A and 2B depict example schematics for cookie data management in previously available solutions.
Figure 2B:
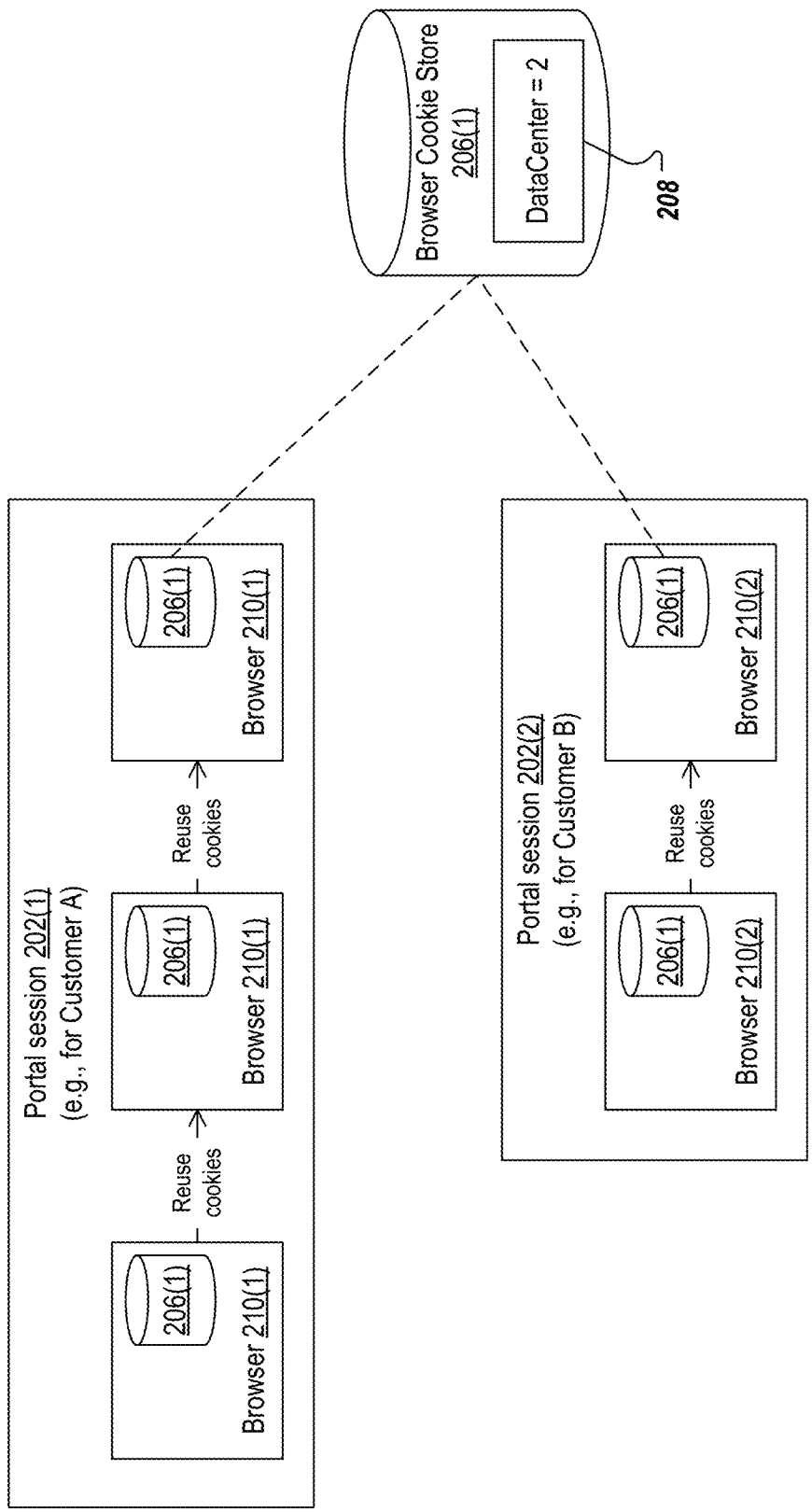
Figure 2C:
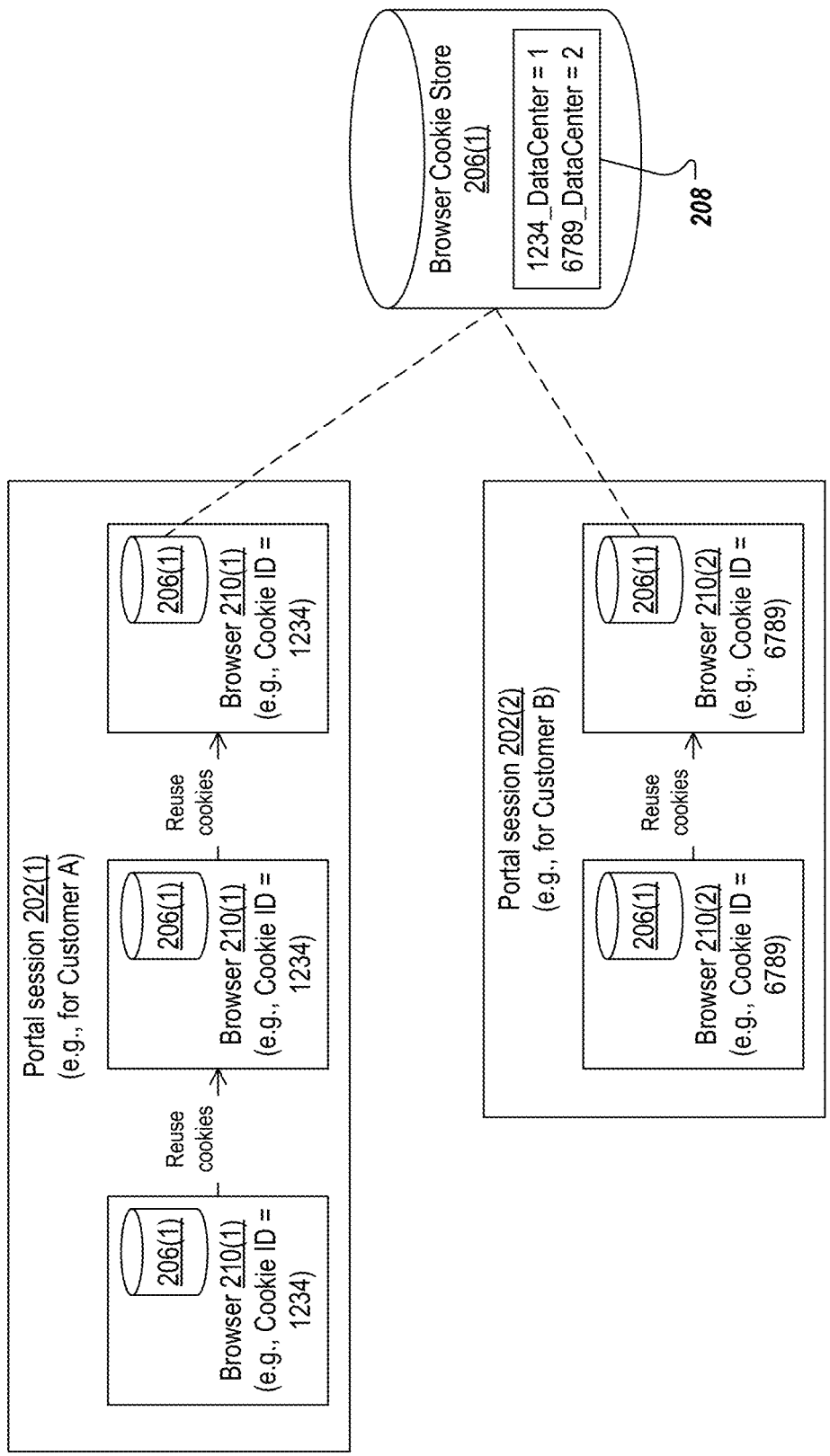
FIGS. 2C-2E depict example schematics for cookie data management, in accordance with implementations of the present disclosure.
Figure 2D:
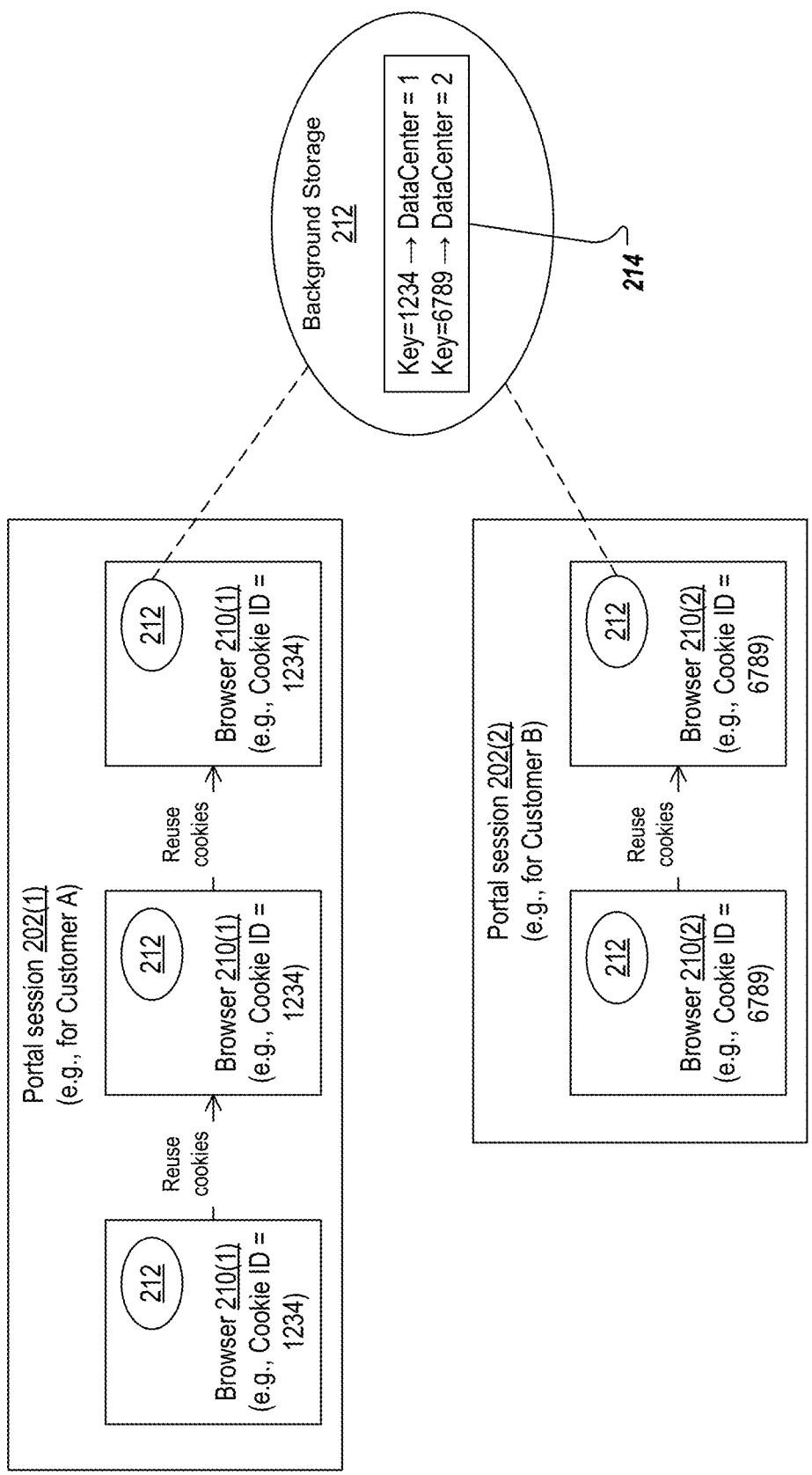
Figure 2E:
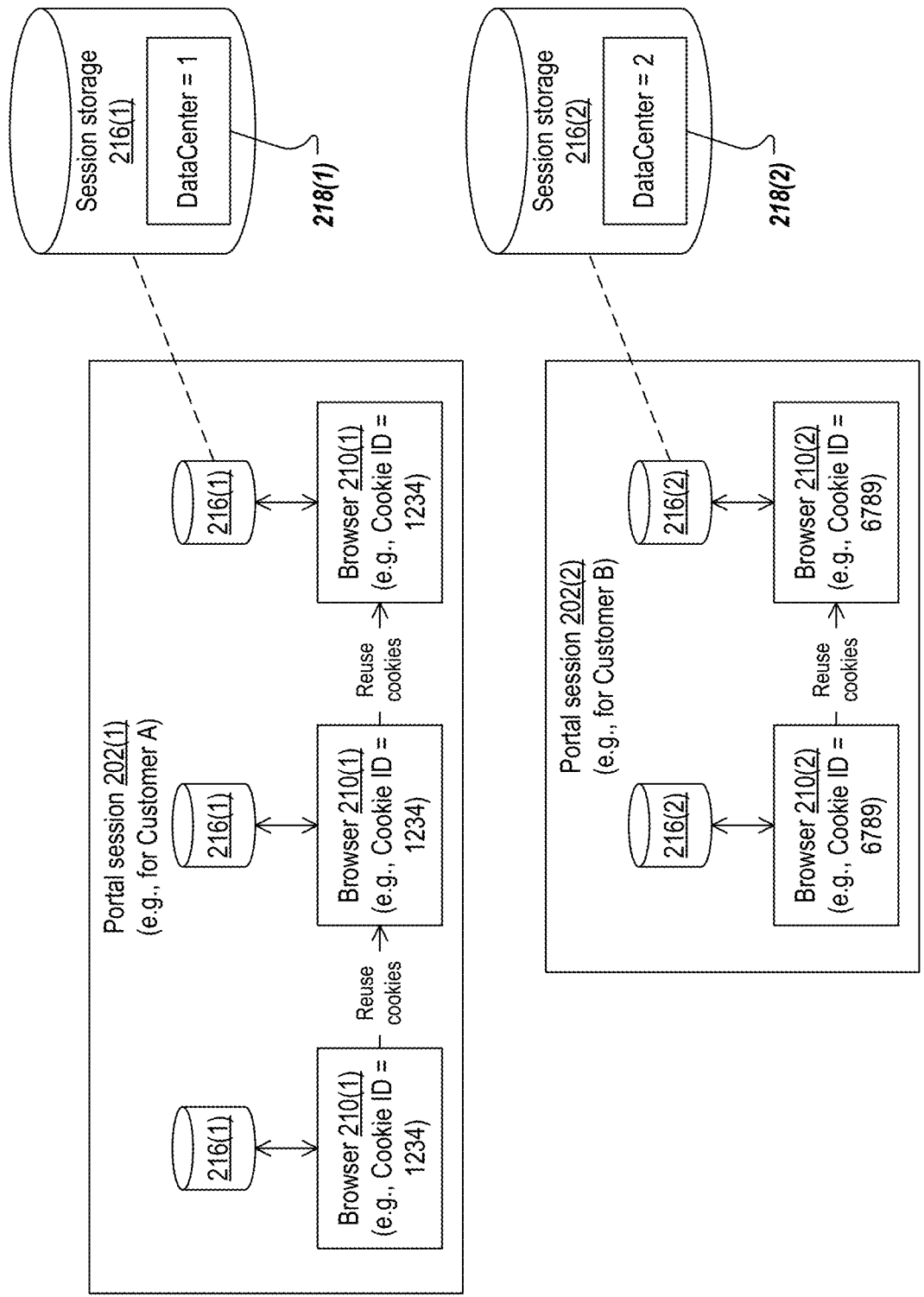

FIGS. 2A and 2B depict example schematics for cookie data management in previously available solutions. FIGS. 2C-2E depict example schematics for cookie data management, in accordance with implementations of the present disclosure.

FIG. 2A depicts a scenario where a browser 204 (e.g., Internet Explorer 11 and previous) has a setting that allows control over when a fresh set of cookies is requested. An application can control when it gets a new set of cookies and when the browser shares such cookies with the parent. Because the setting is controlled by creating a new process, "Request Fresh Browser Cookie Storage" in FIG. 2A corresponds to launching a new browser process, and "Reuse Cookies" in FIG. 2A corresponds to opening a new window (e.g., window.open). For each new customer being serviced by a CSR, the application can request a fresh set of cookies so that the information between customers is not shared.

In the scenario of FIG. 2A, during a first portal session 202(1) with a first customer (e.g., Customer A), using a first browser instance or tab 204(1), the first customer's "DataCenter" cookie can be set to 1 in cookie data 208(1) that is stored in the browser's cookie store 206(1). During a second portal session 202(2) with a second customer (e.g., Customer B), using a second browser instance or tab 204(2), the second customer's "DataCenter" cookie can be set to 2 in the cookie data 208(2) that is stored in the different cookie store 206(2). Because different cookie stores are used, a collision or overwriting of cookie data is avoided in this scenario.

FIG. 2B depicts a scenario where a browser 210 (different from the browser 204 of FIG. 2A) does not include a mechanism to request fresh cookies. For example, Chrome (out of the box) does not include such a mechanism, and all the windows and/or tabs would share the same browser cookie store. Accordingly, the cookie values for each customer could be overwritten as described above.

In the scenario of FIG. 2B, during a first portal session 202(1) with a first customer (e.g., Customer A), using a first browser instance or tab 210(1), the first customer's "DataCenter" cookie can be set to 1 in cookie data 208 that is stored in the browser's cookie store 206(1). During a second portal session 202(2) with a second customer (e.g., Customer B), using a second browser instance or tab 210(2), the second customer's "DataCenter" cookie can be set to 2 in the cookie data 208, thus overwriting the cookie data 208 stored for the first customer. In this example, there is a single DataCenter value within the cookie store, so it would be the last value written and Customer A and Customer B would not have different values. In the example of FIG. 2B, both would appear to have DataCenter 2, which is the last value that was written, even though Customer A should have DataCenter 1.

FIG. 2C depicts another scenario where a browser 210 (e.g., Chrome) does not include a mechanism to request fresh cookies, and cookie isolation is accomplished through a namespace modification of the cookies. Such implementations are described in U.S. Provisional Patent Application No. 62/404,401, titled "Session Cookie Isolation and Management," filed on Oct. 5, 2016, the entirety of which is hereby incorporated by reference into the present disclosure. In such implementations, a browser extension would take the tab ID (shown in FIG. 2C, in the utmost parent, as the "Cookie ID") and write the cookie to the browser's cookie store 206(1) with a namespace containing the ID (e.g., "1234 DataCenter"). The children would also get that parent's cookie ID so they would use the same namespace if cookies are to be shared.

In the example of FIG. 2C, a portal session 202(1) to support Customer A is started in tab (cookie ID) 1234 and its cookies are stored as data 208 in the browser's cookie store with the namespace for that tab. A portal session 202(2) to support Customer B is started in tab (cookie ID) 6789 and its cookies are stored as data 208 in the browser's cookie store with the namespace for that tab, so each customer can have a different DataCenter value, preventing the unintended sharing and/or overwriting of cookies associated with different customers.

FIG. 2D depicts another scenario where a browser 210 (e.g., Chrome) does not include a mechanism to request fresh cookies, and cookie data isolation is accomplished through use of the background storage, according to implementations described herein. In this scenario, in some implementations, the storage location of the cookies is changed from the browser's cookie store to the browser extension's background storage. Accordingly, storage of cookie data is not limited by the browser's size limitations for its cookie storage. The cookie data is retrieved from the response and placed into the background storage, as key-value pairs, with a key that is the tab ID/cookie ID.

In the example of FIG. 2D, a portal session 202(1) to support Customer A is started in tab (cookie ID) 1234 and its cookies are stored as data 214 in the background storage 212 with the key of that tab ID. A portal session 202(2) to support Customer B is started in tab (cookie ID) 6789 and its cookies are stored as data 214 in the background storage 212 with the key for that tab ID, so each customer can have a different DataCenter value. The values are then pulled from the background storage, based on the key, when sent back to the server.

FIG. 2E depicts another scenario where a browser 210 (e.g., Chrome) does not include a mechanism to request fresh cookies, and cookie data isolation is accomplished through use of the background storage and session storage, according to implementations described herein. In this scenario, the cookie data is also written to the page's session storage 216 in addition to being written to the background storage 212. In some instances, the session storage 216 is unique per page, but is accessible by standard HTML.

In the example of FIG. 2E, a portal session 202(1) to support Customer A is started in tab (cookie ID) 1234 and its cookies are stored in the background storage 212 with the key of that tab ID, as described with reference to FIG. 2D. Its cookies are also stored, as session data 218(1), in the session storage 216 for that page. A portal session 202(2) to support Customer B is started in tab (cookie ID) 6789 and its cookies are stored in the background storage with the key for that tab ID, and its cookies are also stored in the session storage 218(2) for that page, so the client side pages can access the DataCenter values for that particular customer. Such implementations enable access, by the client side pages, to the cookie values because the background storage where the cookie values are stored is not available to the client side pages.

Figure 3:
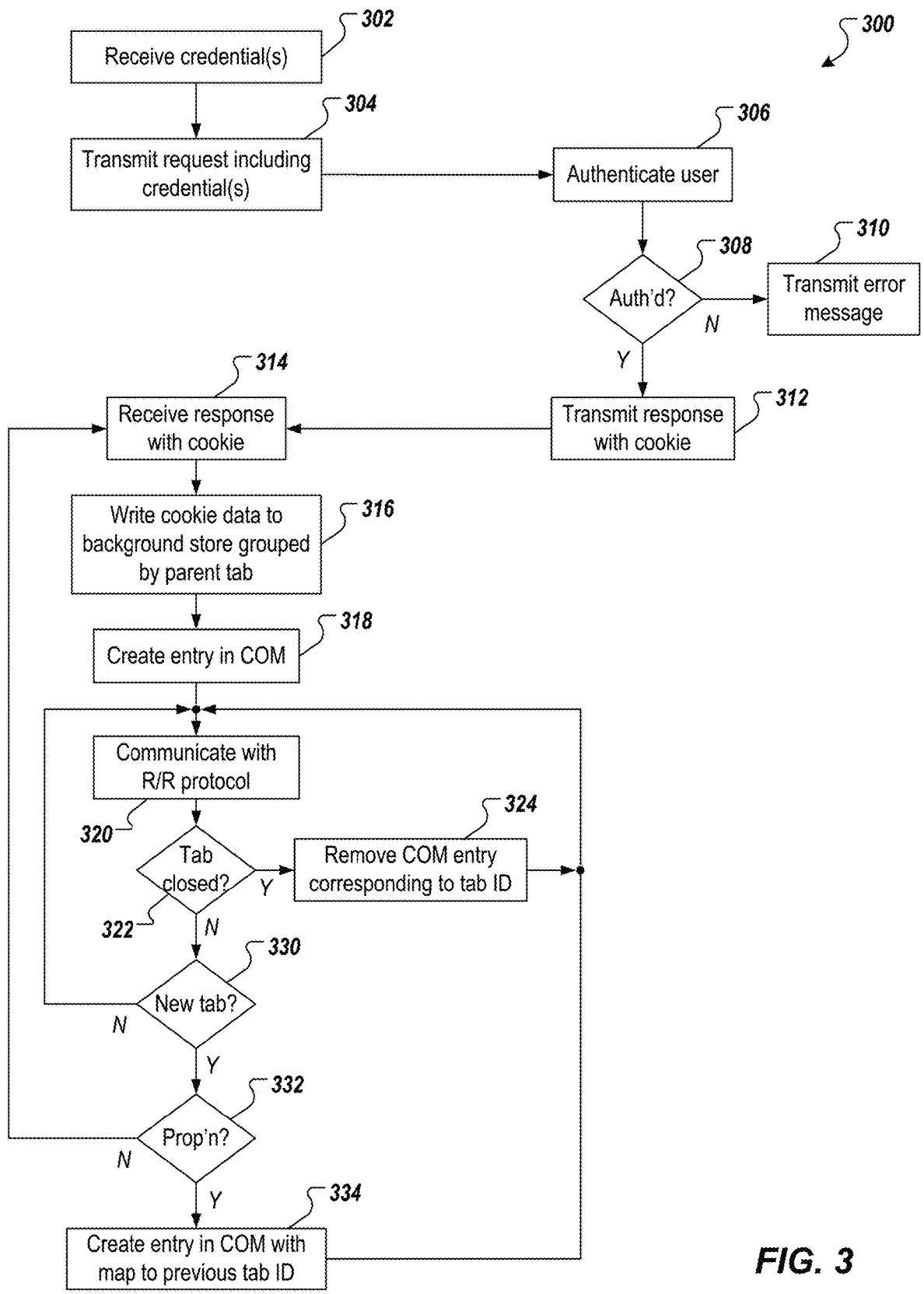
FIG. 3 depicts an example process for session data isolation and management in accordance with implementations of the present disclosure.

FIG. 3 depicts an example process 300 for session data isolation and management in accordance with implementations of the present disclosure. The example process 300 is based on a user (e.g., CSR) opening a browser to log into a web-based application. For example, the user opens a log-in page within a particular domain (e.g., acmeco.com) provided by an enterprise (e.g., Acme Co., a fictional enterprise). In some implementations, the process is performed by a cookie management module executing on the device 102, a browser executing on the device 102, and/or other software module(s).

One or more user credentials are received (302). For example, the user inputs a username and/or password into the log-in page. In some examples, the log-in page is displayed within a tab of the browser, the tab having a unique identifier (tab ID) associated therewith. A request including the one or more credentials is transmitted (304). For example, the browser formulates a request message (e.g., HTTP request) that is transmitted from the client-side computing device to a server that hosts the web-based application. The user is authenticated (306). For example, the web-based application authenticates the user, at least partially based on the one or more credentials in an effort to determine whether the user is who they purport to be, and/or has authority to access the web-based application, and/or user data. It is determined whether the user has been authenticated (308). For example, if the credentials match stored credentials, the user can be determined to be authenticated. On the other hand, if the credentials do not match stored credentials, the user can be determined to not be authenticated. If the user is not authenticated, an error message is transmitted (310). For example, the server can transmit an HTTP response the results in the error message being displayed to the user in the browser (e.g., Username and/or password are incorrect).

If the user is determined to be authenticated, a response with a cookie is transmitted (312). For example, the server can transmit an HTTP response with a cookie in a header of the HTTP response. An example portion of the header can include:

Set-Cookie: cookie1; domain=acmeco.com; path=/csr_apps

In this example, the cookie is called "cookie1" and is set for the domain acmeco.com, and the path/csr_apps within the domain. The response with the cookie is received (314). For example, the browser executing on the client-side computing device receives the HTTP response with the cookie.

The data included in the cookie is written to the background store grouped by the parent tab (316). In some implementations, the data written to the background store is grouped according to the parent tab. For example, cookie data associated with one parent tab (e.g., associated with a particular session and/or customer) is written to a particular portion of the background store, and data associated with another parent tab is written to a different portion of the background store. In some implementations, the cookie data written to the background store includes the name, value, and attributes of the cookie.

A record is made in a cookie owner mapping (COM) (318). For example, it can be determined that the received response is the first response received that is associated with the tab ID, and that the tab ID is not already accounted for in the COM. Consequently, an entry is provided for in the COM. An example entry includes the tab ID, and a mapping. It is contemplated, however, that an entry can include additional information. For example, an example entry can include the tab ID, and the mapping, as well as one or more of an opening tab ID, whether propagation is requested, stored cookies, and cookies sent/received. An example COM for an initial entry is provided above in Table 1, in the first row (Tab ID=1264). Although the example COM depicts the tab ID and the mapping, as well as other information, in some implementations the COM only records the tab ID and the mapping.

Subsequent communication between the client and server is conducted based on a response and request (R/R) protocol (320). An example R/R protocol is discussed in further detail herein (e.g., with reference to FIG. 4). For example, a request can be sent from the tab ID 1264, and a subsequent response received, which includes an example header portion:

Set-Cookie: cookie2; domain=acmeco.com; path=/csr_apps/cust_data

In the example context, the user can submit the request to request data of a particular customer, which data is displayed in the tab having the tab ID 1264. In some examples, the COM only records the tab ID and the mapping. Consequently, in such examples, the COM entries are unchanged upon receipt of a subsequent cookie (e.g., cookie2).

It is determined whether a tab has been closed (322). For example, the user can close a tab within the browser. If a tab has been closed, the entry corresponding to the tab ID of the closed tab is deleted from the COM (324), and the example process 300 loops back. If it is determined that a tab is not closed (322), it is determined whether a new tab has been opened (330). For example, it is determined whether the user has opened a new tab from the browser, or whether the browser has opened a new tab (e.g., in response to user input to an existing tab). If a new tab has not been opened, the example process 300 loops back. If a new tab has been opened, it is determined whether propagation of an existing session has been requested (332). In some examples, a request can include an indicator as to whether propagation is to occur. The indicator can be provided as a parameter in a URL and/or in the request header (e.g., propagate=true). If propagation has been requested, an entry is added to the COM, which maps the new tab to an existing tab (334), and the example process 300 loops back. For example, if a new tab with tab ID 1369 has been opened from the existing tab with tab ID 1264, and propagation has been requested, an entry is added for tab ID 1369 in the COM table. The tab ID 1369 is can be referred to as a child of the tab ID 1264. Consequently, a request sent from tab ID 1369 uses the cookies previously established through tab ID 1264. In some examples, the COM only records the tab ID and the mapping. Consequently, in such examples, the added COM entry only includes the tab ID 1369 and the mapping 1369→1264.

If propagation has not been requested, the example process 300 loops back to treat the newly opened tab as an independent tab (e.g., a parent tab). This can occur, for example, if the new tab is opened from an existing tab, but propagation has not been requested, such that communications through the new tab do not carry the previously established cookie information from the existing tab. For example, the tab ID 1381 is opened from the existing tab ID 1264, but propagation has not been requested. Consequently, the entry for tab ID 1381 does not include a mapping back to tab ID 1263. In another example, a new tab can be opened independently of an existing tab (e.g., a new browser window is opened separate from an existing browser window). In such instances, the tab ID 1513 is completely independent of any existing tab ID in the COM.

Figure 4:
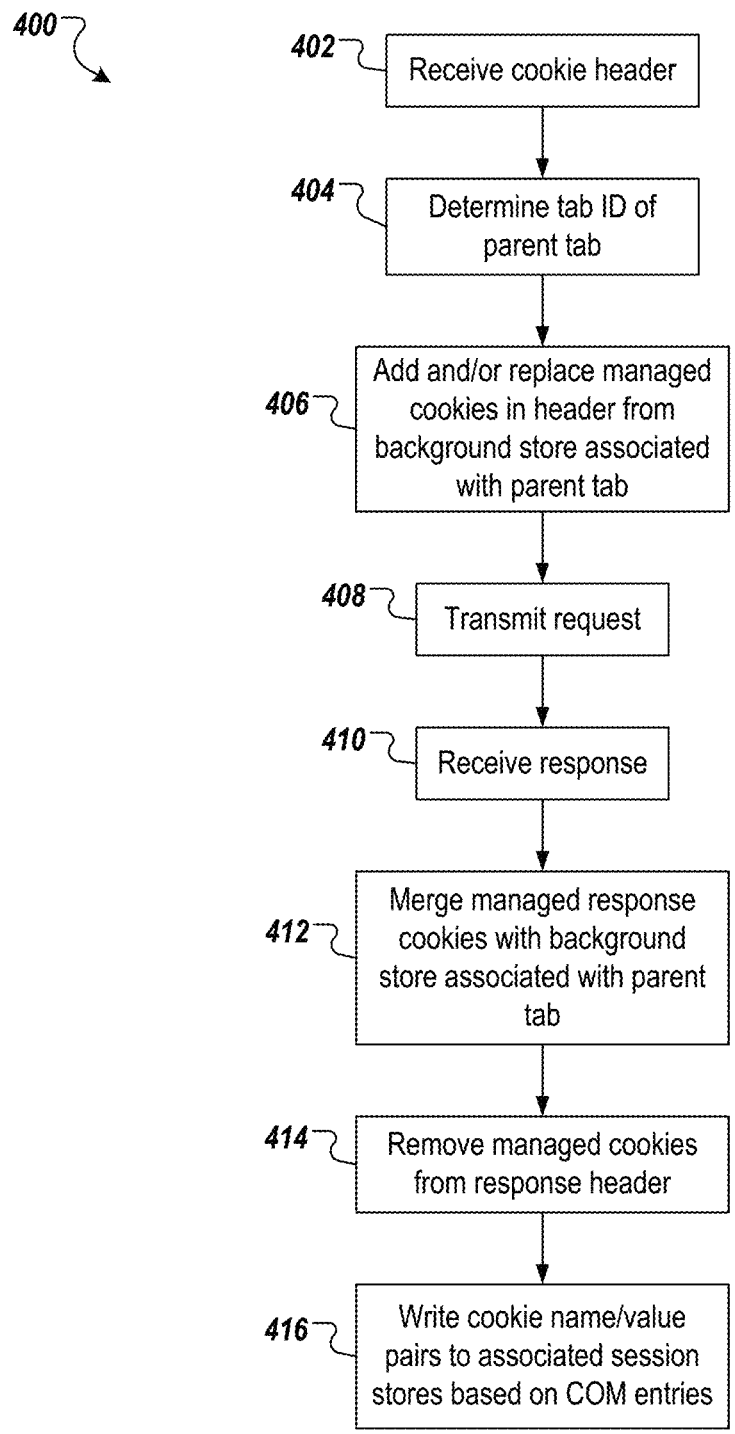
FIG. 4 depicts an example process for cookie header management in accordance with implementations of the present disclosure.

FIG. 4 depicts an example process 400 for cookie header management in accordance with implementations of the present disclosure. The example process of FIG. 4 can be performed as, or be part of a R/R protocol introduced above. In some implementations, the process is performed by a cookie management module executing on the device 102, a browser executing on the device 102, and/or other software module(s). In the depicted example, the example process 400 begins from the client-side computing device preparing to send a request to the server.

A header of the request is received and is based on one or more modified cookies (402). The tab ID of the parent tab is determined (404). In some examples, the tab ID is determined based on the tab, from which the request was initiated, and the mapping(s) of the COM. For example, it can be determined that the tab originating the request includes the tab ID 1264, and the tab ID 1264 maps to itself (e.g., the tab ID 1264 is the parent tab) (see Table 1). As another example, it can be determined that the tab originating the request includes the tab ID 1674, and the tab ID 1674 maps to the tab ID 1264 (e.g., the tab ID 1264 is the parent tab) (see Table 1).

The managed cookies are added to the header, and/or replaced in the header, with data retrieved from the background store associated with the parent tab (406). Some implementations include additional logic for particular cookies, based on a prefix of the cookies, page origin (e.g., to mimic browser cookie scoping rules), or other externally controlled criteria. For example, if it is determined that a particular user is a production user and not a test user, a determination is made of other browsers that the user is using, or that a page will launch under a specific browser.

The request is transmitted (408). For example, the request is sent as an HTTP request from the client-side computing device to the server.

A response is received (410). For example, the server processes the request and sends a response to the client-side computing device. For example, a request can be sent from the tab ID 1264, and a subsequent response received, which includes an example header portion:

Set-Cookie: cookie2; domain=acmeco.com; path=/csr_apps/cust_data

In the example context, the user can submit the request for data of a particular customer, which data is displayed in the tab having the tab ID 1264. The managed response cookies are merged with data from the background store associated with the parent tab (412). The managed cookies are removed from the response header (414). One or more cookie name/value pairs are written to associated session stores based on COM entries (416). In some implementations, the data is moved from session storage to background storage. The data is merged, during response, into the COM and then placed back in the request as well as in session storage. In some implementations, background storage is used for tracking and the session storage is used (e.g., as a "courtesy") to allow the page to see a copy of the data that is being tracked.

A response header might contain an update to an already tracked cookie. In this instance, the response header value replaces that of the background store data. Once the header is processed, including removing any managed cookies and updating the background store, the session store is updated for each tab in the tab-owner hierarchy. After updating the session stores, an event notification is sent to those same tabs telling them that session storage has been updated, as described above. In some implementations, the process does not support changes in session storage migrating back into the background store. The process can be modified to do so by implementing a similar event notice from the page to the extension.

In some implementations, managed cookie(s) are removed from the response header, and added to the request header. Managed cookies are written to the request header, overwriting any cookies that have already been domain- and path-matched by the browser (e.g., per RFC 6265 sections 5.1.3, 5.1.4 for response, 5.4 for request). In some instances, there is not cookie data to inject into the request header when it is the first request, and the processing may commence on receiving the first response that includes cookies to be managed. Subsequent requests can then be modified according to what information has been retrieved from responses. There is also a scenario, mentioned above, where the client could have created a cookie that is to be managed, but it may not actually be processed until the first response. Accordingly, a set of communications between browser and server may begin with a request, although the cookie management operations described herein may not begin until the first response is received.

Through the process described above, the page may be enabled to access cookies that are no longer actually stored as cookies, and are instead stored as cookie data. After writing to the session stores, using the mechanisms provided by the browser extension framework described herein, implementations may also trigger an event that lets the page know there have been updates. Throughout the process, events may be triggered and listeners can respond to the events. The process may also include one or more of the following steps: an event is triggered, with cookie data, in the background page that the content script page is listening for; the content script page writes the cookies contained in the event to the session store for that page; the content script triggers an event that the page is listening on; and the page determines how to listen for and/or react to that event.

In some implementations, a set of key-value pairs is stored in session storage, to manage the cookie data. The key-value store in the session storage may provide a mapping such that each key, which identifies a tab (e.g., the tab ID), is mapped to a collection of cookies that are managed for the session. The collection of cookies may also be described as a blob of data. The blob may be formatted according to any suitable data format. In some implementations, the blob is formatted according to a version of the JavaScript Object Notation (JSON) format. The blob may be the value that is associated with a particular key, and which may be accessed using the particular key. In some implementations, the session storage is itself a key-value store, so an identifier key is used to mark these cookies and provide them in the value as a JSON-formatted set of key/value pairs to match the cookies.

The session storage is a particular type of local storage that is not written to persistent storage. Implementations provide a mechanism through which cookies that would traditionally be managed through the browser are managed independently of the browser. Cookies to be managed independently are identified and the cookie data is prevented from reaching the browser in the typical manner. Instead, the cookie data for the managed cookies is stored in the blob in session storage and retrieved by the browser as needed to process the page(s). The cookie store in the browser may not be aware of the cookies, and the local page is not able to look for the cookies as cookies in the cookie store. Instead, the page may retrieve the cookie data from the session storage. When the browser sends out a request to a remote server, the cookie data is retrieved from the background store and injected back into the request so that the request is received, at the server, in the expected format including the appropriate cookie data. In general, the cookie data may be used, by the page, for any suitable processing that the page JavaScript is configured to use it for. A page might use the data for eventual rendering or other processing by the JavaScript or other active page elements.

The page can see the managed cookie data through session storage because the page is provided with a "copy," but the page cannot cause it to impact the request as a cookie. Accordingly, session storage provides a view into what is being managed. The extension has now taken over other managed cookie operations. The actual processing of the request header is managed by the extension which has the managed data in background storage. In some implementations, the only system that is allowed to modify managed cookie data or remove a managed cookie is the server.

An analogy of this relationship would be similar to a database that is considered the system of record. Changes to the data occur at the system of record (e.g., only). Any other views of this data are read-only (e.g., similar to a report, or in a data warehouse database) and cannot be changed from those locations. Similarly, background storage is the system of record, and session storage is a copy that can be viewed by the page.

In some implementations, the cookies that are to be managed independently of the cookie store are indicated in a whitelist. The whitelist indicates the particular one or more cookies that are to be isolated and managed independently from the cookie store. The managed cookies can include, but are not limited to, cookies used for data center routing, end-user (e.g., customer) data tracking, and/or cookies used for tracking end-user authentication. For example, managed cookies may include one or more cookies for data center routing, such as cookie(s) used to track which data center is to handle requests from a particular end-user during a time period. As another example, managed cookies may include cookie(s) for tracking the behavior of an end-user in the system, such as whether the end-user employed different devices (e.g., a desktop computer as well as a smartphone) during a time period to access information provided through different end-user experiences. Such data may be used for quality control to enhance or improve usability of the web page(s). As another example, managed cookies may include cookie(s) used to track which authentication methods are to be used for a particular end-user. As another example, managed cookies may include cookie(s) that store a user's session-specific data for failover if a particular server or node fails, the data used to seamlessly transfer the user's session to another server or node (e.g., application server) without losing any of the data. In some instances, the managed cookies store GUIDs for linking other data also including, but still not limited to, tracking information and/or non-end-user data (e.g., system authentication data). Implementations support the management of cookies that store any suitable type of data that is used for any suitable purpose.

Figure 5:
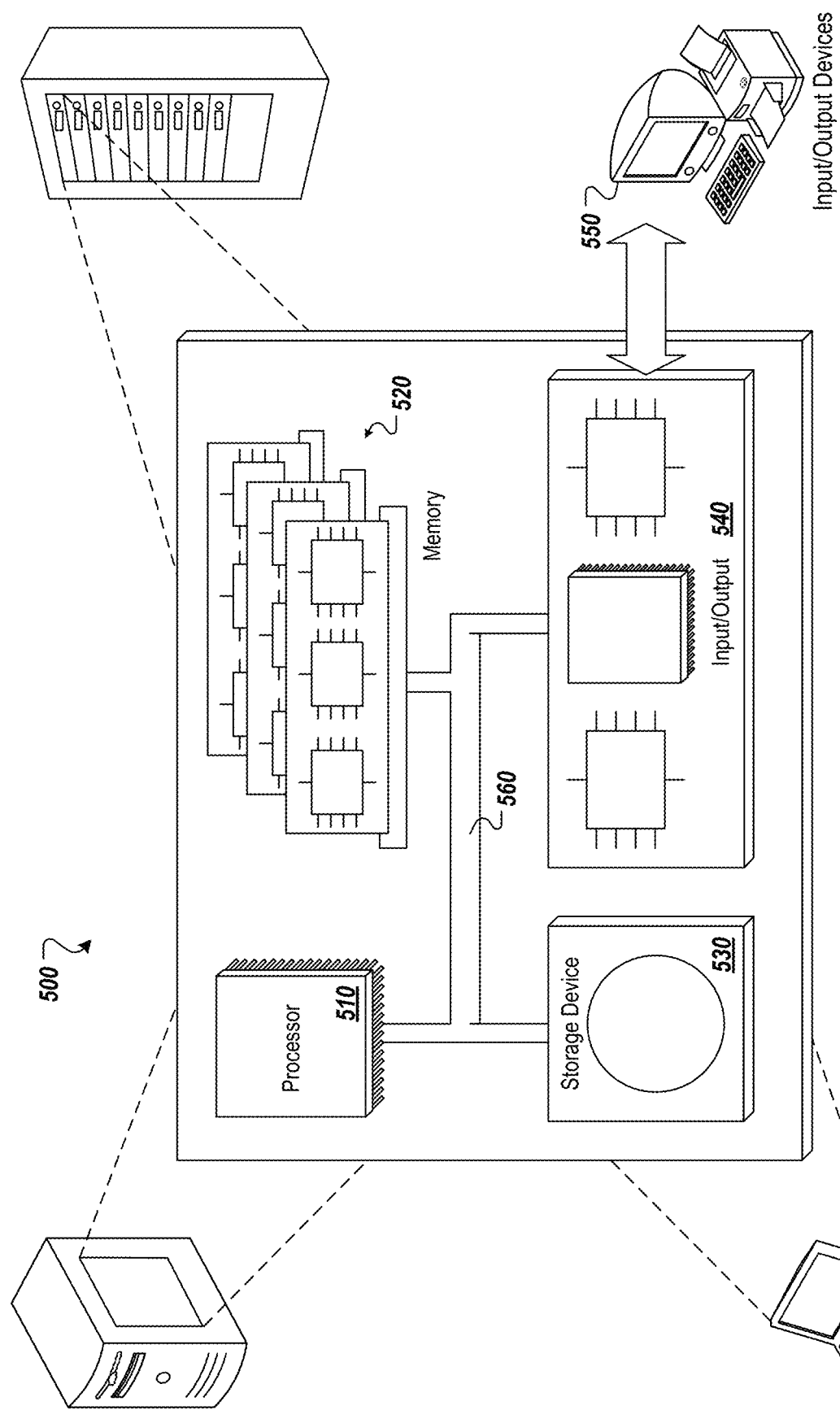
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the device 102, the device 104, and/or other computing device(s) and/or computing system(s) described herein. The system 500 may include one or more processors 510, a memory 520, one or more storage devices 530, and one or more input/output (I/O) devices 550 controllable through one or more I/O interfaces 540. The various components 510, 520, 530, 540, or 550 may be interconnected through at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
    responsive to detecting a request to be transmitted from a web browser on a computing device to a server, determining, by the at least one processor of the computing device, an identifier associated with a tab used to initiate the request in the web browser;
    incorporating, by the at least one processor of the computing device, into a request header of the request, first cookie data for at least one managed cookie, the first cookie data stored in background storage associated with the tab;

transmitting, by the at least one processor of the computing device, the request to the server;

receiving, by the at least one processor of the computing device, a response from the server;

merging in the background storage, by the at least one processor of the computing device, the first cookie data with second cookie data for the at least one managed cookie that is included in a response header of the response;

removing, by the at least one processor of the computing device, the at least one managed cookie from the response header, prior to providing the response for processing by the web browser; and storing, by the at least one processor of the computing device, the second cookie data for the at least one managed cookie in session storage associated with the tab.

2. The method of claim 1, wherein:
the tab used to initiate the request is a parent tab; and
the identifier is a tab identifier of the parent tab.

3. The method of claim 1, wherein:
the tab used to initiate the request is a child tab of a parent tab; and
the identifier is a tab identifier of the parent tab.

4. The method of claim 3, wherein the parent-child relationship between the parent tab and the child tab is determined based on a cookie owner mapping (COM).

5. The method of claim 1, further comprising:
modifying, by the at least one processor, the first cookie data based on cookie data stored in the background storage associated with the tab, prior to transmitting the request.

6. The method of claim 1, wherein the second cookie data for the at least one managed cookie is stored in a key-value store in the background storage, the key-value store providing a mapping between the identifier and the second cookie data.

7. The method of claim 1, wherein the at least one managed cookie is designated in a whitelist that indicates which cookies are to be managed independently of a cookie store of the web browser.

8. The method of claim 1, wherein the at least one managed cookie includes one or more of: end-user data, end-user authentication information, data center routing information for an end-user, and failover data for the end-user.

9. A system comprising:
at least one processor; and
a memory communicatively coupled to the at least one processor, the memory storing instructions which, when executed by the at least one processor, cause the at least one processor to perform operations comprising:
responsive to detecting a request to be transmitted from a web browser on a computing device to a server, determining, by the computer device, an identifier associated with a tab used to initiate the request in the web browser;
incorporating, by the computer device, into a request header of the request, first cookie data for at least one managed cookie, the first cookie data stored in background storage associated with the tab;
transmitting, by the computer device, the request to the server;
receiving, by the computer device, a response from the server;
merging in the background storage, by the computer device, the first cookie data with second cookie data for the at least one managed cookie that is included in a response header of the response;
removing, by the computer device, the at least one managed cookie from the response header, prior to providing the response for processing by the web browser; and
storing, by the computer device, the second cookie data for the at least one managed cookie in session storage associated with the tab.

10. The system of claim 9, wherein:
the tab used to initiate the request is a parent tab; and
the identifier is a tab identifier of the parent tab.

11. The system of claim 9, wherein:
the tab used to initiate the request is a child tab of a parent tab; and
the identifier is a tab identifier of the parent tab.

12. The system of claim 11, wherein the parent-child relationship between the parent tab and the child tab is determined based on a cookie owner mapping (COM).

13. The system of claim 9, the operations further comprising:
modifying the first cookie data based on cookie data stored in the background storage associated with the tab, prior to transmitting the request.

14. The system of claim 9, wherein the second cookie data for the at least one managed cookie is stored in a key-value store in the background storage, the key-value store providing a mapping between the identifier and the second cookie data.

15. The system of claim 9, wherein the at least one managed cookie is designated in a whitelist that indicates which cookies are to be managed independently of a cookie store of the web browser.

16. The system of claim 9, wherein the at least one managed cookie includes one or more of: end-user data, end-user authentication information, data center routing information for an end-user, and failover data for the end-user.

17. One or more non-transitory computer-readable media storing instructions which, when executed by at least one processor, cause the at least one processor to perform operations comprising:
responsive to detecting a request to be transmitted from a web browser on a computing device to a server, determining, by the computer device, an identifier associated with a tab used to initiate the request in the web browser;
incorporating, by the computer device, into a request header of the request, first cookie data for at least one managed cookie, the first cookie data stored in background storage associated with the tab;
transmitting, by the computer device, the request to the server;
receiving, by the computer device, a response from the server;
merging in the background storage, by the computer device, the first cookie data with second cookie data for the at least one managed cookie that is included in a response header of the response;
removing, by the computer device, the at least one managed cookie from the response header, prior to providing the response for processing by the web browser; and storing, by the computer device, the second cookie data for the at least one managed cookie in session storage associated with the tab.

18. The one or more non-transitory computer-readable media of claim 17, wherein:
the tab used to initiate the request is a parent tab; and
the identifier is a tab identifier of the parent tab.

19. The one or more non-transitory computer-readable media of claim 17, wherein:
the tab used to initiate the request is a child tab of a parent tab; and
the identifier is a tab identifier of the parent tab.

20. The one or more non-transitory computer-readable media of claim 19, wherein the parent-child relationship between the parent tab and the child tab is determined based on a cookie owner mapping (COM).

* * * * *